United States Patent
Hansen et al.

(10) Patent No.: US 10,081,082 B2
(45) Date of Patent: Sep. 25, 2018

(54) LEADING EDGE SHEATH MANUFACTURING METHOD

(71) Applicant: UNITED TECHNOLOGIES CORPORATION, Farmington, CT (US)

(72) Inventors: James O. Hansen, Glastonbury, CT (US); David Ulrich Furrer, Marlborough, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 474 days.

(21) Appl. No.: 14/768,633

(22) PCT Filed: Dec. 16, 2013

(86) PCT No.: PCT/US2013/075325
§ 371 (c)(1),
(2) Date: Aug. 18, 2015

(87) PCT Pub. No.: WO2014/143260
PCT Pub. Date: Sep. 18, 2014

(65) Prior Publication Data
US 2016/0001407 A1    Jan. 7, 2016

Related U.S. Application Data

(60) Provisional application No. 61/787,741, filed on Mar. 15, 2013.

(51) Int. Cl.
*B23P 15/04* (2006.01)
*B21D 53/78* (2006.01)
(Continued)

(52) U.S. Cl.
CPC .............. *B23P 15/04* (2013.01); *B21D 53/78* (2013.01); *F01D 5/288* (2013.01); *F04D 29/324* (2013.01);
(Continued)

(58) Field of Classification Search
CPC ....... F01D 5/288; F04D 29/324; B21D 53/78; F05D 2220/32; F05D 2230/20; F05D 2240/303
See application file for complete search history.

(56) References Cited

U.S. PATENT DOCUMENTS

| | | |
|---|---|---|
| 2,422,810 A | 6/1947 | Tiedemann |
| 2,463,101 A | 3/1949 | Gruetjen |

(Continued)

FOREIGN PATENT DOCUMENTS

| | | | |
|---|---|---|---|
| EP | 1995412 A2 | 11/2008 | |
| WO | 9423890 A1 | 10/1994 | |

OTHER PUBLICATIONS

International Search Report Application No. PCT/US2013/075325; dated Apr. 7, 2014.
European Search Report for Application No. EP 13 87 8459.

*Primary Examiner* — Moshe Wilensky
(74) *Attorney, Agent, or Firm* — Cantor Colburn LLP (57) ABSTRACT

A method for manufacturing a protective sheath for a fan blade leading edge is described. The method may comprise generating a preform plate from a stock plate wherein the preform plate has a flattened surface and an inclined surface having a spike flanked by a first side and a second side. The method may further comprise bending the first side and the second side away from the spike to generate a sheath intermediate followed by generating the protective sheath from the sheath intermediate by shaping an outer surface and (Continued)

an inner surface of the sheath intermediate to match the contour of the fan blade leading edge.

20 Claims, 7 Drawing Sheets

(51) Int. Cl.
*F04D 29/32* (2006.01)
*F01D 5/28* (2006.01)
*B21K 3/04* (2006.01)
*B21H 7/00* (2006.01)

(52) U.S. Cl.
CPC .................. *B21H 7/00* (2013.01); *B21K 3/04* (2013.01); *F05D 2220/32* (2013.01); *F05D 2230/20* (2013.01); *F05D 2240/303* (2013.01)

(56) References Cited

U.S. PATENT DOCUMENTS

| | | |
|---|---|---|
| 2,544,447 A | 3/1951 | Dodds |
| 5,168,741 A | 12/1992 | Braunheim et al. |
| 5,881,972 A | 3/1999 | Smith et al. |
| 5,908,285 A | 6/1999 | Graff |
| 2011/0116906 A1 | 5/2011 | Smith et al. |
| 2011/0211967 A1 | 9/2011 | Deal et al. |
| 2011/0274555 A1 | 11/2011 | Iwasaki |
| 2012/0174384 A1 | 7/2012 | Leconte et al. |

LEADING EDGE SHEATH MANUFACTURING METHOD

CROSS-REFERENCE TO RELATED APPLICATION

This Application is a US National Stage under 35 USC § 371 of International Patent Application No. PCT/US2013/075325 filed on Dec. 16, 2013 and claims priority to U.S. Provisional Patent Application Ser. No. 61/787,741 filed on Mar. 15, 2013.

TECHNICAL FIELD

The present disclosure generally relates to the manufacture of protective sheaths for fan blades and, more specifically, relates to providing a method for manufacturing protective sheaths for fan blade leading edges in a gas turbine engine.

DESCRIPTION OF THE RELATED ART

Fans in aircraft gas turbine engines use mechanical energy from the turbine to accelerate air through the engine to assist in creating thrust. During operation, the fan blades, particularly the front tips (or leading edges) of the fan blades, may become damaged upon exposure to foreign objects. For example, the fan blades may be damaged by impact with foreign objects such as birds, ice, or hail. In order to protect fan blades in gas turbine engines from damage caused by impact with foreign objects, the entire leading edge of each fan blade may be covered with a protective sheath. The protective sheath fits over the fan blade leading edge and improves the stiffness of the fan blade, improves its resistance to certain environments and foreign objects, decreases vibrational responses on the fan blade resulting from unwanted aerodynamic loading, and improves its resistance against erosion.

Protective sheaths are characterized by an inner diameter (ID) slot which comprises a cavity configured to fit over the leading edge of the fan blade. The ID slot of the sheath ideally comprises dimensions and an inner contour that directly mirrors the dimensions of the fan blade leading edge outer contour, such that the sheath forms an air-tight seal over the fan blade leading edge. The ID slot is delimited by the space between two "wings" which fit over and at least partially cover the front and back surfaces of the fan blade. A protective sheath is also characterized by the shape of its "leading edge nose" which sits directly on top of the fan blade leading edge and ultimately forms an extension of the fan blade leading edge. In general, it is important for the protective sheath to have a leading edge nose shape that conforms to the outer contour of the fan blade leading edge in order to preserve the aerodynamic design and operation of the fan blade.

Shaping the ID slot and the leading edge nose of a protective sheath to match the dimensions and contours of the fan blade leading edge can pose a significant challenge in its manufacture, however. In particular, the change in cross-sectional area between the leading edge nose of the sheath and the wings makes the formation of the sheath difficult by conventional processes. Current known methods for the manufacture of leading edge protective sheaths are inefficient, time consuming, and require laborious steps and expensive equipment. Many of the known manufacturing methods for protective sheaths machine the sheath from a larger input plate or bar stock material such that much of the input stock material is not incorporated into the final product and is discarded. Manufacturing methods for leading edge sheaths that are able to access desired ID slots and leading edge nose shapes in an inexpensive and efficient way are wanting.

One known method uses conventional machining to shape the ID slot and leading edge nose of the protective sheath from a larger block of input stock material. A similar strategy uses conventional machining to partially shape the sheath with the "wings" flared followed by a hot forming step to mold the sheath with the wings down over a mandrel that conforms to the shape of the fan blade leading edge. However, these methods are not cost-effective or efficient as much of the input material is discarded. Moreover, it is difficult to produce dimensionally acceptable sheaths by these methods.

Another known method to manufacture leading edge sheaths uses electro discharge machining (EDM) to shape the ID slot from a larger block of input metallic stock material. EDM shapes the metallic block using electrical discharges/sparks that selectively remove material from the metallic block. The EDM step requires multiple separate tools and leaves a recast layer on the ID slot that requires removal by a separate chemical milling step. The leading edge nose is then formed by a conventional machining process. This method is less than ideal for the manufacture of protective sheaths as it requires multiple tools and time consuming steps, a chemical milling step, and a high input of stock material, much of which is thrown away.

Another known manufacturing method, as described, for example, in U.S. Pat. No. 5,908,285, uses nickel electroforming to generate leading edge protective sheaths. By this approach, a mandrel having an exterior surface that conforms to the shape of the fan blade leading edge is placed in a nickel solution and is subjected to an electric current. Nickel particles are subsequently deposited on the mandrel to build up the sheath structure on the mandrel in a "bottom-up" type of approach. Although this method is associated with a low input of stock material, the difficulty in producing sheaths with sufficient thickness electroforming is well-known in the industry.

While several strategies like those described above exist for the manufacture of leading edge protective sheaths, many are plagued by drawbacks such as a requirement for a large input of stock material, inefficiency, expensive and time consuming steps, and a difficulty in producing dimensionally acceptable sheaths. Clearly, there is a need for sheath manufacturing methods that overcome these disadvantages.

SUMMARY OF THE DISCLOSURE

In accordance with one aspect of the present disclosure, a method for manufacturing a protective sheath for a fan blade leading edge is disclosed. The method may comprise generating a preform plate from an input stock plate. The preform plate may have a flat surface and an inclined surface. The inclined surface may have a spike extending away from the inclined surface and the spike may be flanked by a first side and a second side. The method may further comprise bending the first side and the second side away from the spike to generate a sheath intermediate followed by generating the protective sheath from the sheath intermediate by shaping an outer surface and an inner surface of the sheath intermediate to match the contour of the fan blade leading edge.

In another refinement, the shaped inner surface of the protective sheath may form an inner diameter slot configured to receive the fan blade leading edge.

In another refinement, generating the protective sheath from the sheath intermediate may be performed by a superplastic forming process.

In another refinement, the superplastic forming process may comprise placing the sheath intermediate over a mandrel in the shape of the fan blade leading edge, heating the sheath intermediate to a temperature conducive to superplastic deformation, and using a tool to shape the outer surface and the inner surface of the sheath intermediate to match the contour of the fan blade leading edge.

In another refinement, bending the first side and the second side away from the spike may be performed by a cold forming process over a mandrel.

In another refinement, the cold forming process may be performed at room temperature.

In another refinement, bending the first side and the second side away from the spike may be performed by a warm forming process over a mandrel.

In another refinement, the warm forming process may be performed at an elevated temperature between about 200° C. and about 1500° C.

In another refinement, the preform plate may be generated from the stock plate by a contour roll plate technique.

In another refinement, the preform plate may be generated from the stock plate by a method selected from the group consisting of a contour roll plate technique, conventional machining, and hot forging.

In another refinement, the method may further comprise bonding the protective sheath to the fan blade using at least one adhesive.

In another refinement, the protective sheath may be formed from titanium.

In another refinement, the protective sheath may be formed from titanium 6Al-4V.

In accordance with another aspect of the present disclosure, a method for manufacturing a protective sheath for a fan blade leading edge using a preform plate as input stock material is disclosed. The preform plate may have a flat surface and an inclined surface. The inclined surface may have a spike extending away from the inclined surface and the spike may be bordered by a first side and a second side. The method may comprise bending the first side and the second side away from the spike to introduce a bend into the flat surface and to generate a sheath intermediate. The method may further comprise generating the protective sheath from the sheath intermediate by shaping an outer surface and an inner surface of the sheath intermediate to match the contour of the fan blade leading edge. The shaped inner surface of the protective sheath may form an inner diameter slot configured to receive the fan blade leading edge.

In another refinement, generating the protective sheath from the sheath intermediate may be performed by a superplastic forming process.

In another refinement, bending the first side and the second side away from the spike may be performed by a cold forming process over a mandrel.

In another refinement, bending the first side and the second side away from the spike may be performed by a warm forming process over a mandrel.

In another refinement, the preform plate may be generated from the stock plate by a contour roll plate technique.

In another refinement, the preform plate may be generated from the stock plate by a method selected from the group consisting of a contour roll plate technique, conventional machining, and hot forging.

In accordance with another aspect of the present disclosure, a fan blade protective sheath having an outer surface and an inner diameter slot configured to receive a fan blade leading edge is disclosed. The outer surface and the inner diameter slot of the protective sheath may have a shape that conforms to the shape of the fan blade leading edge. The fan blade protective sheath may be formed by a method comprising generating a preform plate from an input stock plate. The preform plate may have a flat surface an inclined surface. The inclined surface may have a spike extending away from the inclined surface and a first side and a second side may flank the spike. The method may further comprise bending the first side and the second side away from the spike to generate a sheath intermediate followed by generating the protective sheath from the sheath intermediate by shaping an outer surface and an inner surface of the sheath intermediate to match the contour of the fan blade leading edge. The shaped inner surface of the protective sheath may form the inner diameter slot.

These and other aspects and features of the present disclosure will be more readily understood when taken in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use in conjunction with a particular type of fan blade. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
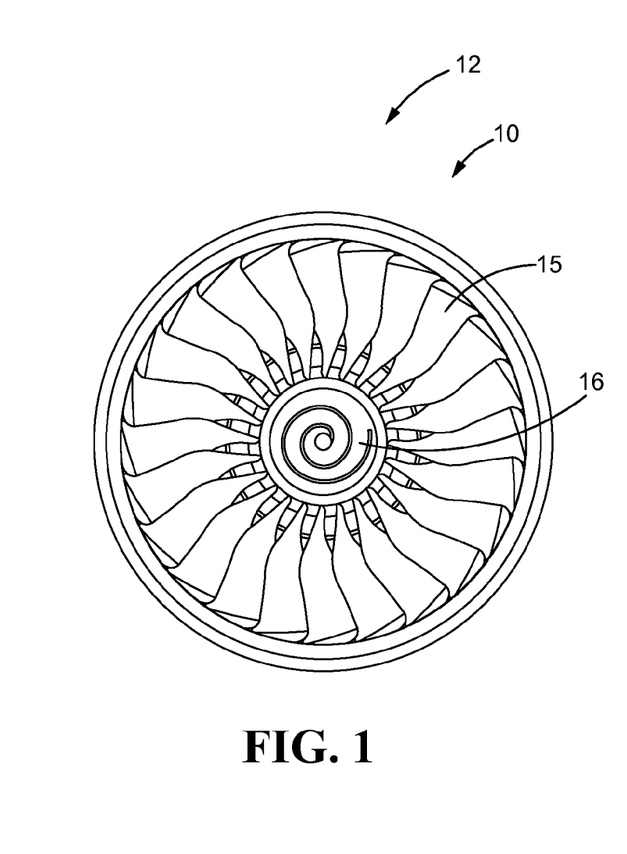
FIG. 1 is a front view of a fan of a gas turbine engine constructed in accordance with the present disclosure.

Referring now to the drawings, and with specific reference to FIG. 1, a perspective view of a fan 10 of a gas turbine engine 12 is shown. The fan 10 may be involved in using mechanical energy from a turbine (not shown) to accelerate air through the engine 12 to assist in generating thrust if used in an aircraft, or power if used in land-based operations.

Figures 2, 3:
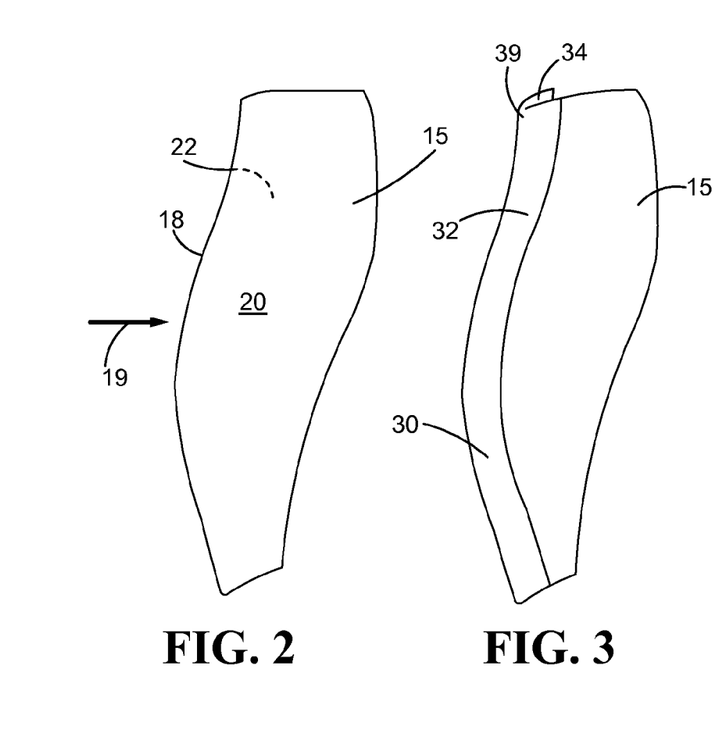
FIG. 2 is a perspective view of a fan blade illustrating the leading edge without a protective sheath.
FIG. 3 is a perspective view of the leading edge of the fan blade of FIG. 2 provided with a protective sheath constructed in accordance with the present disclosure.

The fan 10 has a plurality of fan blades 15 radially extending from a hub 16, as shown. Fan blades 15 may be made from aluminum, titanium, a metal alloy, a composite material, or any other suitable composition. FIG. 2 shows an isolated fan blade 15 (without a protective sheath), illustrating a leading edge 18 of the fan blade 15. During fan operation, the fan blade leading edge 18 is the portion of the fan blade that first contacts air moving through the engine in the direction of arrow 19, as shown. The fan blade 15 may further have a leading surface 20 and a trailing surface 22, as shown. The leading surface 20 may be oriented toward the direction of fan rotation and the trailing surface 22 may be oriented away from the direction of fan rotation. Upon impact with debris such as, for example, birds, hail, ice, or other objects in the environment, the leading edge 18 as well as the surfaces 20 and 22 may become damaged and thereby interfere with the operation of the gas turbine engine 12. Furthermore, the leading edge 18 and the surfaces 20 and 22 may be damaged by erosion caused by environmental exposure over a certain time.

FIG. 3 shows the leading edge 18 of the fan blade 15 provided with a protective sheath 30 in accordance with the present disclosure. The protective sheath 30 may structurally reinforce and stiffen the fan blade 15 and assist preventing damage to the fan blade 15 upon impact with debris and other objects encountered during the operation of the fan 10. The protective sheath 30 may further act to reduce the vibrational flutter of fan blade 15 and may assist preventing fan blade erosion. The protective sheath 30 may be formed from titanium, such as titanium 6Al-4V. Alternatively, the protective sheath 30 may be formed from a titanium alloy, a nickel alloy, nickel, or other suitable composition chosen by a skilled artisan.

The protective sheath 30 may fit over the leading edge 18 in order to protect and structurally reinforce the fan blade 15 and may at least partially cover the surfaces 20 and 22 of the fan blade 15, as shown. The protective sheath 30 may be bonded or otherwise joined to the fan blade 15 with an adhesive or other suitable bonding arrangement. Alternatively, the protective sheath 30 may be engaged with the fan blade 15 without bonding.

Figure 4:
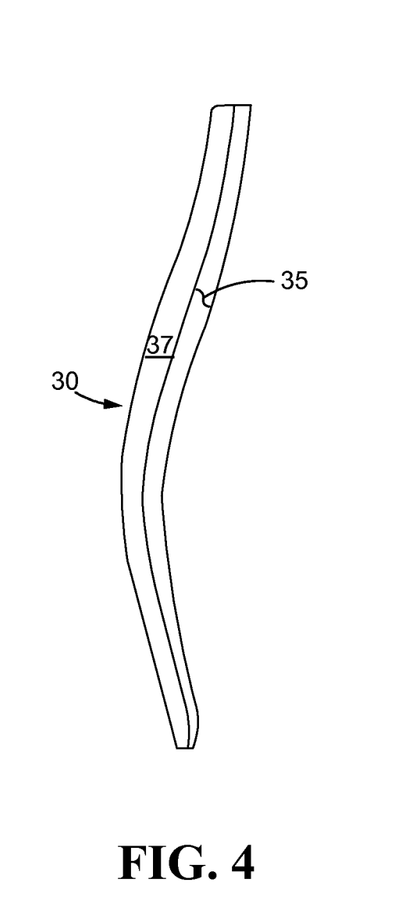
FIG. 4 is a side view of the protective sheath constructed in accordance with the present disclosure.
Figure 5:
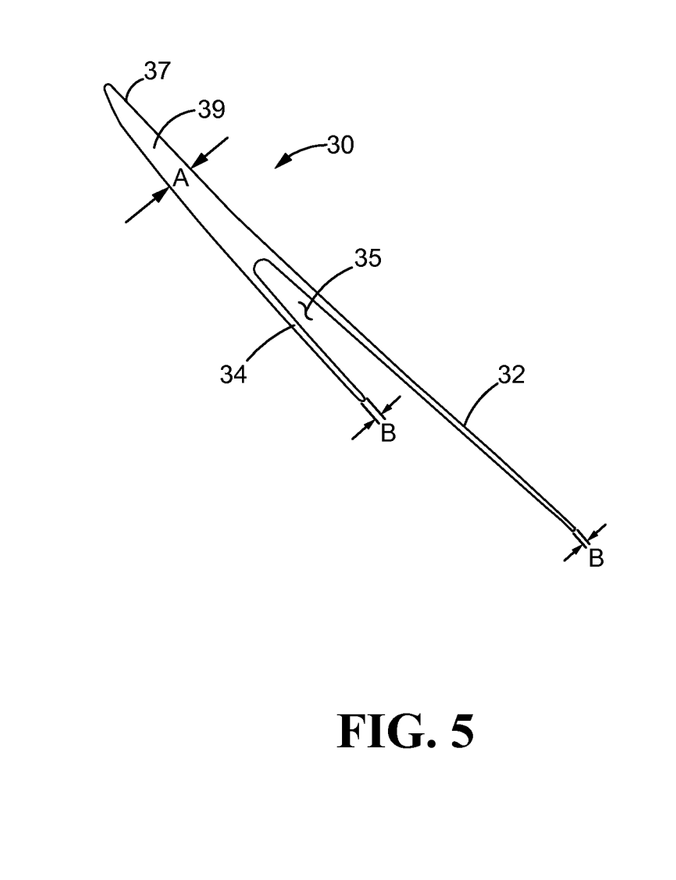
FIG. 5 is a top view of the protective sheath of FIG. 4 constructed in accordance with the present disclosure.

Turning now to FIGS. 4 and 5, the protective sheath 30 is shown in isolation. The protective sheath 30 may have two wings which may include a longer first wing 32 and a shorter second wing 34, as best shown in FIG. 5. The first wing 32 may at least partially cover the leading surface 20 of the fan blade 15, and the second wing 34 may at least partially cover the trailing surface 22 of the fan blade 15. The protective sheath 30 may have an ID slot 35 forming a cavity configured to receive the fan blade leading edge 18. The ID slot 35 may be delimited by the space between the first wing 32 and the second wing 34, as best shown in FIG. 5. The ID slot 35 may have an inner contour that fully conforms to the contour of leading edge 18 such that an air tight seal may be formed when the protective sheath 30 is engaged with the fan blade 15. The protective sheath 30 may also have a contoured outer surface 37 having a shape that conforms to the contour of leading edge 18. In addition, as best shown in FIG. 5, the protective sheath 30 may have a leading edge nose 39 with a shape that conforms to the shape of the leading edge 18. A skilled artisan will understand that, depending on the structure and use of the fan blade 15, the overall shape, dimensions, relative wing sizes, and contours of the protective sheath 30 may deviate from those shown in FIGS. 4 and 5.

As shown in FIG. 5, the leading edge nose 39 may have a wall thickness A that is significantly greater than the wall thicknesses B of the wings 32 and 34. In one embodiment, the relative wall thicknesses of the leading edge nose 39 to the wings 32/34 may be about three to one. The wings 32 and 34 may have a thickness B in the range of about 0.02 inches to about 0.04 inches. However, depending on the shape and use of the fan blade 15 as well as other design and engineering considerations, the wall thicknesses and relative wall thicknesses of the leading edge nose 39 and the wings 32/34 may vary significantly.

Figure 6:
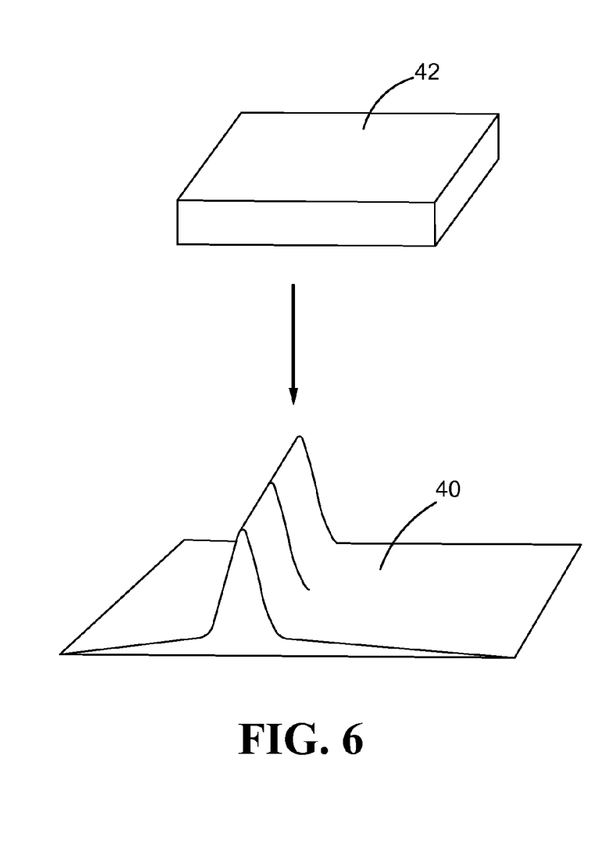
FIG. 6 is a perspective view, schematically illustrating the formation of the preform plate from a stock plate, in accordance with a method of the present disclosure.

FIG. 6 illustrates the formation of a preform plate 40 from a stock plate 42 in accordance with a method of the present disclosure. Once formed, the preform plate 40 may serve as input stock material for the manufacture of the protective sheath 30 (see further details below). The preform plate 40 may be generated from the stock plate 42 by a contour roll plate technique, by hot forging (or press forging), conventional machining, or additive manufacturing, as will be discussed in further detail below. The stock plate 42 may be comprised of titanium, such as titanium-6Al-4V, or it may be comprised of a titanium alloy, a nickel alloy, nickel, or other suitable metallic composition.

Figure 7:
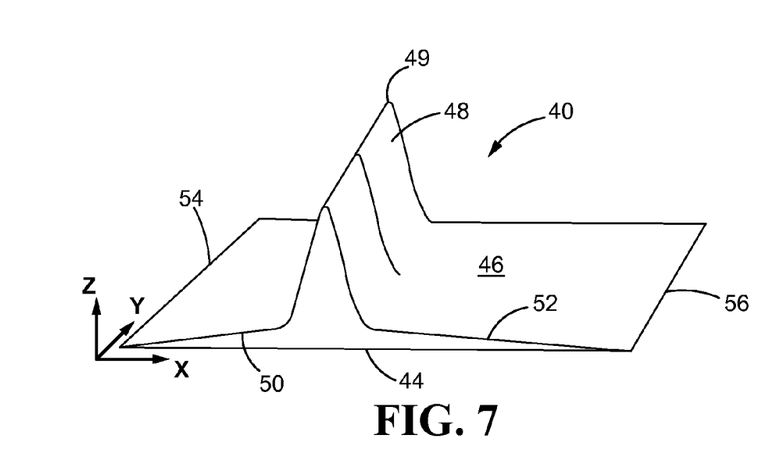
FIG. 7 is a perspective view of the preform plate constructed in accordance with the present disclosure.
Figure 8:
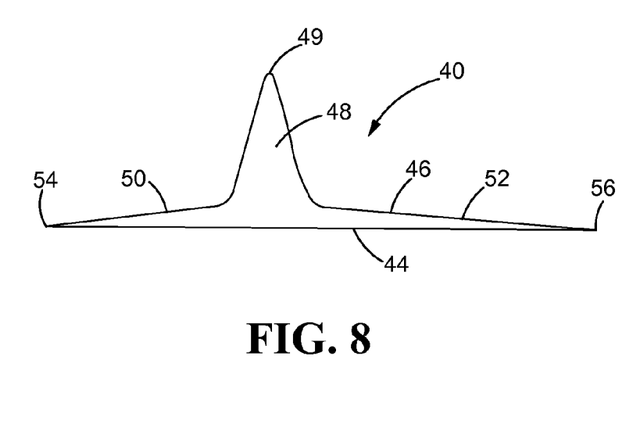
FIG. 8 is a side view of the preform plate of FIG. 6.

Turning now to FIGS. 7 and 8, the structure of the preform plate 40 is shown in greater detail. The preform plate 40 may have a length, a width, and a height along the x, y, and z axes, respectively, as best shown in FIG. 7, and may have a flattened surface 44 and an inclined surface 46. Moreover, the inclined surface 46 may have a spike 48 projecting along the height (z) of the preform plate 40 that may come to an apex 49, as shown. The spike 48 may have a fixed shape, which may be approximately triangular in side view, and a fixed cross-sectional area across the width (y) of the preform plate 40, as shown. In the final protective sheath 30, the spike 48 may form the leading edge nose 39.

As shown in FIGS. 7 and 8, the inclined surface 46 may have a first side 50 and a second side 52 which may be tapered and may become progressively thinner from the spike 48 towards the ends 54 and 56, respectively. The sides 50 and 52 may flank the spike 48, as shown. In the final protective sheath 30, the sides 50 and 52 may ultimately form the wings 32 and 34, as will be discussed in further detail below. However, depending on the shape and use of fan blade 15 as well as other design and engineering considerations, the shape of preform plate 40 may deviate from those shown in FIGS. 6-8.

Figure 9:
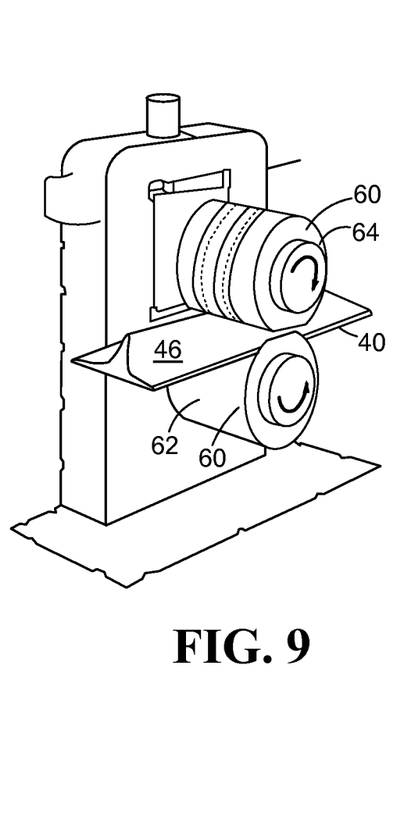
FIG. 9 is a perspective view, illustrating the formation of the preform plate by a contour roll plate technique, in accordance with a method of the present disclosure.

A number of different methods for generating the preform plate 40 from the stock plate 42 will now be described. The preform plate 40 may be generated from the stock plate 42 by a contour rolled plate technique, as depicted in FIG. 9. By this technique, the stock plate 42, which may initially have a uniform thickness, may first be passed through a series of rollers at a temperature conducive to plate deformation in order to progressively reduce the stock plate 42 to a desired thickness (process not shown). The thinned stock plate may then be passed between two roller dies 60, one roller die 60 having a flattened surface (flattened roller 62) to provide the flattened surface 44 of preform plate 40, and the other roller die 60 having an imprinted surface (imprinted roller 64) to provide the inclined surface 46 of the preform plate 40 (see FIG. 7). The thinned stock plate may be repeatedly passed between the roller dies 60 until the desired shape and dimensions of the preform plate 40 is generated. The contour rolled plate method may be performed at a temperature conducive to titanium plate deformation such as between about 1500° F. and about 1700° F. but other temperatures may also be suitable depending on the plate composition and other considerations. Given that nearly all of the input plate material is used to generate the preform plate 40 and the machinery used for the contour roll plate method is not expensive, the contour rolled plate technique may provide an efficient and inexpensive method to generate the preform plate 40.

Figure 10:
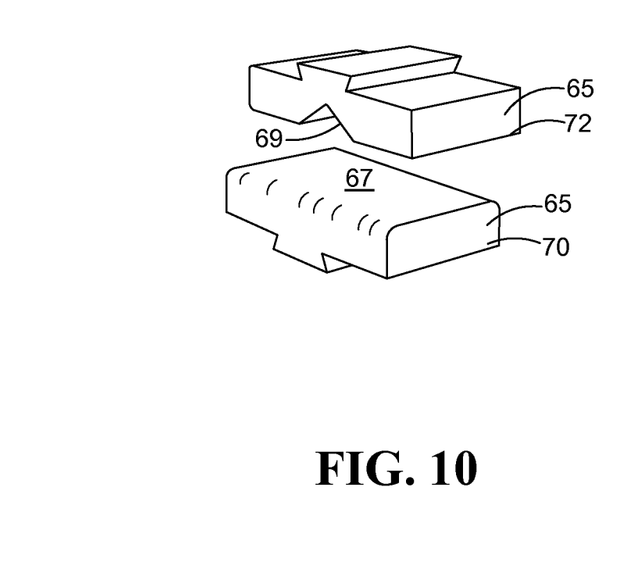
FIG. 10 is a perspective view, illustrating exemplary dies for the formation of the preform plate by hot forging, in accordance with the present disclosure.

As an alternative method, the preform plate 40 may be generated from the stock plate 42 by a hot forging (or press forging) technique. The hot forging technique may involve heating the stock plate 42 to a temperature that promotes superplasticity and subsequently pressing the heated stock plate 42 between two dies 65, exemplary illustrations of which are shown in FIG. 10. One of the dies 65 (flattened die 70) may have a flattened surface 67 to form the flattened surface 44 of the preform plate 40 and the other die 65 (contoured die 72) may have a contoured surface 69 to form the inclined surface 46 of the preform plate 40. For a titanium input stock plate, superplasticity may be achieved at about 1650° F. (900° C.). However, depending on the composition of the stock plate 42 and other conditions and engineering considerations, the optimal temperature range for hot forging may vary significantly. Furthermore, the skilled artisan will understand that, in practice, the shapes and dimensions of the dies 65 used for the hot forging technique may deviate from those shown in FIG. 10.

Alternatively, the preform plate 40 may be generated from the stock plate 42 by conventional machining whereby the preform plate 40 is carved out from the stock plate 42 using low cost machining tools. As yet another alternative method, the preform plate 40 may be generated by additive manufacture in which the spike 48 may be built up layer by layer on an appropriately dimensioned metal sheet material by a cladding process or a selected welding process which may include 3D printing, electron beam welding, gas tungsten arc welding (GTAW), laser deposit welding, cold spraying, or other welding processes. The advantage of the additive manufacture method for generating the preform plate 40 may be a reduction in machining requirements and input stock material.

Figure 11:
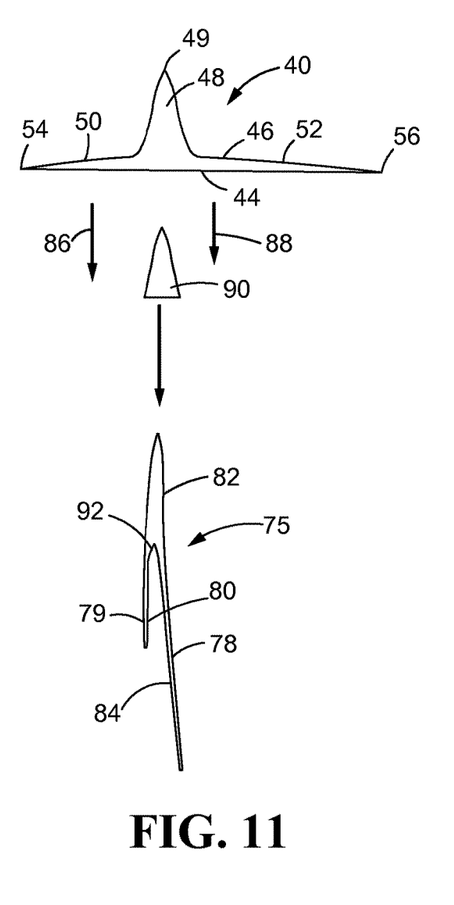
FIG. 11 is a side view, schematically illustrating the formation of a sheath intermediate from the preform plate, in accordance with a method of the present disclosure.
Figure 12:
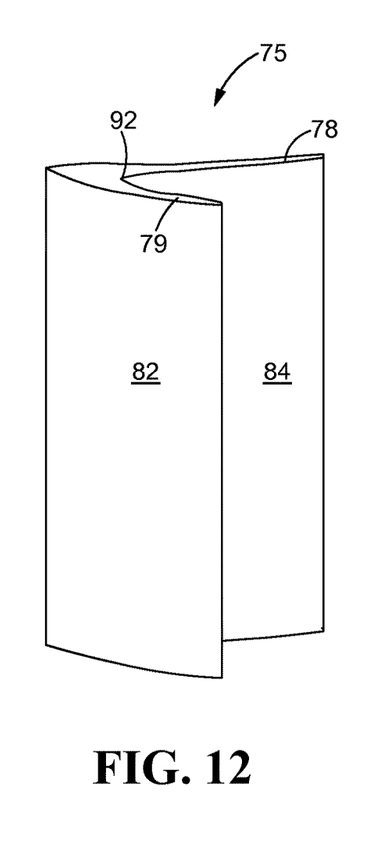
FIG. 12 is a perspective view of the sheath intermediate of FIG. 11.

Once the preform plate 40 is formed, a sheath intermediate 75 may be formed in accordance with the present disclosure, as shown in FIGS. 11 and 12. The sheath intermediate 75 is the form the material of the preform plate 40 takes during the next manufacturing step towards the protective sheath 30. The sheath intermediate 75 may have intermediate wings 78 and 79 and a cavity 80 between intermediate the wings 78 and 79, as shown. The sheath intermediate 75 may have an outer surface 82 and an inner surface 84, as best shown in FIG. 12. The outer surface 82 and the inner surface 84 may not have the curvature of the contoured outer surface 37 and the ID slot 35 of the protective sheath 30 once ultimately produced.

The preform plate 40 may be converted to the sheath intermediate 75 by a cold forming process 86 or a warm forming process 88, as shown in FIG. 11. The conversion of the preform plate 40 into the sheath intermediate 75 by the cold forming process 86 or the warm forming process 88 may involve bending the sides 50 and 52 in a direction away from the spike 48, as shown. This may be done over an appropriately shaped mandrel 90 using a press and a set of tools (tools not shown) and may introduce a bend 92 in the flattened surface 44, as shown. The cold forming process may be performed at room temperature, while the warm forming process may be performed at a selected elevated temperature conducive to the bending of the metallic material of preform plate 40. The selected elevated temperature may be chosen such that oxidation of the metallic material of preform plate 40 is avoided. The elevated temperatures for the warm forming process may be in the range of 200-1500° F. or may be even higher if warm forming is performed under a vacuum where metal oxidation is reduced. However, depending on the composition of preform plate 40 as well other conditions, the temperature selected for the cold forming or warm forming process may vary significantly. Importantly, the conversion of preform plate 40 to sheath intermediate 75 by the process shown in FIG. 11 may be performed without discarding any of the material of preform plate 40.

Figure 13:
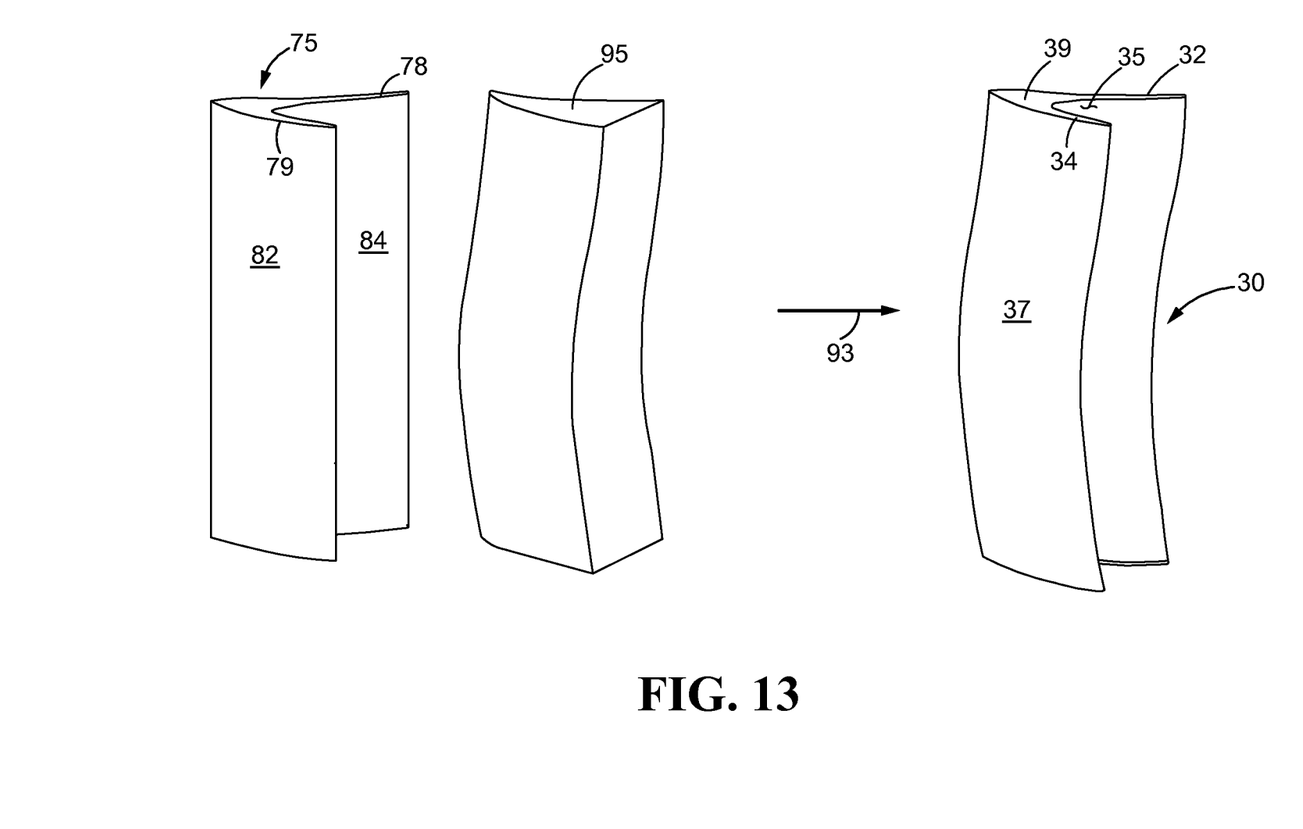
FIG. 13 is a perspective view, schematically illustrating the formation of the protective sheath from the sheath intermediate, in accordance with a method of the present disclosure.

A last step according to the present disclosure may be the formation of the protective sheath 30 from the sheath intermediate 75, as best shown in FIG. 13. The sheath intermediate 75 may be converted to the protective sheath 30 by introducing curvature into the outer surface 82 and the inner surface 84 to provide the contoured outer surface 37 and the ID slot 35, as shown. Curvature may be introduced into the outer surface 82 and the inner surface 84 of the sheath intermediate 75 by a hot or superplastic forming process 93. In so doing, the sheath intermediate 75 may be placed on a mandrel 95 which may be in the shape of the desired fan blade leading edge 18 and the sheath intermediate 75 may then be heated to a temperature that promotes superplasticity and metal deformation. A tool (not shown) may be used to shape the outer surface 82 and the inner surface 84 of the heated sheath intermediate 75 over the mandrel 95 in order to form the contoured outer surface 37 and the ID slot 35, respectively, thereby providing the protective sheath 30. The superplastic forming process may be performed under air or vacuum and may be performed at a temperature in the range of between about 200° F. to about 1700° F., but other temperatures may also suffice depending on the composition of the protective sheath 30. Similar to the step for formation of the sheath intermediate 75 described above, it is important to note that the conversion of the sheath intermediate 75 to the protective sheath 30 by the process shown in FIG. 13 may be performed without discarding any of the material of sheath intermediate 75.

As another alternative approach, the protective sheath 30 may be generated from the sheath intermediate 75 using a combination of a hard tool (i.e., mandrel 95) and a 'soft' tool such as a rubber pad or other similar relatively soft materials. In this way, the sheath intermediate 75 may first be placed between the mandrel 95 and a soft tool and then pressure may be applied on the side of the soft tool by hydroforming or shock loading to force the sheath intermediate 75 to adopt the shape of the mandrel 95 and thereby develop the contoured outer surface 37 and the ID slot 35. It should be noted that although FIG. 13 shows the mandrel 95 (hard tool) being placed on the inner surface 84 of the sheath intermediate 75 such that the soft tool would be placed on the outer surface 82, it will be understood that another appropriately shaped mandrel/hard tool having the shape of the fan blade leading edge may also be configured for placement on the outer surface 82 such that the soft tool would be placed on the inner surface 84 to achieve the same result. As yet another alternative method, the protective sheath 30 may also be also be directly generated from the preform plate 40 by superplastic formation such that the step forming the sheath intermediate 75 may be eliminated.

Once formed, it can be seen that the protective sheath 30 may be configured to receive the leading edge 18 of the fan blade 15 in the ID slot 35, as best shown in FIG. 3. The protective sheath 30 may then be bonded or otherwise joined to the leading edge 18 using a suitable adhesive or other suitable arrangement.

Figure 14:
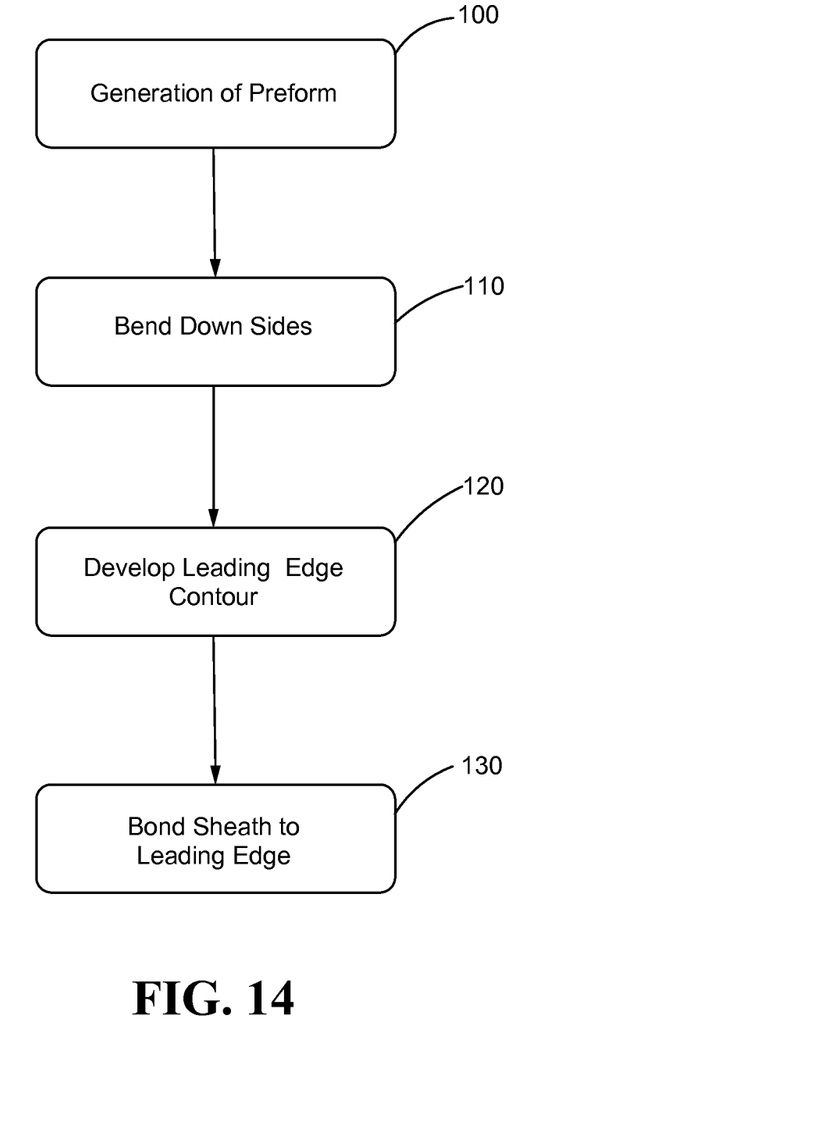
FIG. 14 is a flow chart, illustrating a sample sequence of steps which may be involved in the manufacture of the protective sheath, in accordance with a method of the present disclosure.

In summary, FIG. 14 illustrates the steps which may be involved in the manufacture of the protective sheath 30, in accordance with the present disclosure. Starting with a block 100, the preform plate 40 may be produced from the stock plate 42 by a contour rolled plate technique, a conventional machining process, or a hot forging process as described above. The preform plate 40 may also be generated by additive manufacture by building up the spike 48 layer by layer on an appropriately dimensioned metal sheet material. Following the block 100, the sides 50 and 52 of the preform plate 40 may be bent down as shown by a block 110. According to the block 110, the sides 50 and 52 of the preform plate 40 may be bent down by a cold or warm forming shaping process over the mandrel 90 to produce the sheath intermediate 75 (see FIG. 11). However, as the outer surface 82 and the inner surface 84 of the sheath intermediate 75 may lack the curvature of the fan blade leading edge 18, during a block 120, the outer surface 82 and the inner surface 84 may be shaped over a mandrel 95 to develop the contoured outer surface 37 and the ID slot 35, thereby generating the protective sheath 30, as shown in FIG. 13. Alternatively, the leading edge contour may be developed on the sheath intermediate 75 by placing it between an appropriately shaped mandrel (or hard tool) and a soft tool and subsequently applying pressure on the side of the soft tool to force the sheath intermediate 75 to adopt the shape of the mandrel. The contoured outer surface 37 and the ID slot 35 may have a contour matching the contour of the fan blade leading edge 18. The protective sheath 30 may then be bonded or otherwise joined to the leading edge 18 of the fan blade according to block 130, as shown.

INDUSTRIAL APPLICABILITY

In general, it can be seen that the technology disclosed herein has industrial applicability in a variety of settings including, but not limited to, aircraft and gas turbine engine construction. The generation of a protective leading edge sheath from a preform plate minimizes the amount of input stock material that is discarded in the manufacture process, reduces tooling costs, and increases production efficiency compared with currently known methods. Moreover, the generation of protective sheaths from a preform plate provides straightforward access to protective sheaths having the desired change in cross-sectional area between the leading edge nose and the wings as well as access to ID slots having shapes and dimensions fully conforming to the shape of the fan blade leading edge.

While only certain embodiments have been set forth, alternative embodiments and various modifications will be apparent from the above descriptions to those skilled in the art. These and other alternatives are considered equivalents and within the spirit and scope of this disclosure.

What is claimed is:

1. A method for manufacturing a protective sheath for a fan blade leading edge comprising:
   generating a preform plate from an input stock plate, the preform plate having a flat surface and an inclined surface, the inclined surface having a spike extending away from the inclined surface, the preform plate further including a first side and a second side flanking the spike;
   bending the first side and the second side away from the spike to generate a sheath intermediate, wherein the sheath intermediate is generated from the preform plate without discarding any material of the preform plate; and
   generating the protective sheath from the sheath intermediate by shaping an outer surface and an inner surface of the sheath intermediate to match the contour of the fan blade leading edge.

2. The method according to claim 1, wherein the shaped inner surface forms an inner diameter slot configured to receive the fan blade leading edge.

3. A method for manufacturing a protective sheath for a fan blade leading edge comprising:
   generating a preform plate from an input stock plate, the preform plate having a flat surface and an inclined surface, the inclined surface having a spike extending away from the inclined surface, the preform plate further including a first side and a second side flanking the spike;
   bending the first side and the second side away from the spike to generate a sheath intermediate;
   generating the protective sheath from the sheath intermediate by shaping an outer surface and an inner surface of the sheath intermediate to match the contour of the fan blade leading edge, wherein the shaped inner surface forms an inner diameter slot configured to receive the fan blade leading edge, and wherein generating the protective sheath from the sheath intermediate is performed by a superplastic forming process.

4. The method according to claim 3, wherein the superplastic forming process comprises:
   placing the sheath intermediate over a mandrel in the shape of the fan blade leading edge;
   heating the sheath intermediate to a temperature conducive to superplastic deformation; and
   using a tool to shape the outer surface and the inner surface of the sheath intermediate to match the contour of the fan blade leading edge.

5. The method according to claim 3, wherein bending the first side and second side is performed by a cold forming process over a mandrel.

6. The method according to claim 5, wherein the cold forming process is performed at room temperature.

7. The method according to claim 3, wherein bending the first side and the second side is performed by a warm forming process over a mandrel.

8. The method according to claim 7, wherein the warm forming process is performed between about 200° C. and about 1500° C.

9. The method according to claim 3, wherein generating the preform plate from the stock plate is performed by a contour roll plate technique.

10. The method according to claim 3, wherein generating the preform plate from the stock plate is performed by a method selected from the group consisting of a contour roll plate technique, conventional machining, and hot forging.

11. The method according to claim 10, further comprising the step of bonding the protective sheath to the fan blade using at least one adhesive.

12. The method according to claim 10, wherein the protective sheath is formed from titanium.

13. A method for manufacturing a protective sheath for a fan blade leading edge using a preform plate as input stock material, the preform plate having a flat surface and an inclined surface, the inclined surface having a spike extending away from the inclined surface, the spike being bordered by a first side and a second side, said method comprising:

bending the first side and the second side away from the spike to introduce a bend into the flat surface and to generate a sheath intermediate, wherein the sheath intermediate is generated from the preform plate without discarding any material of the preform plate; and generating the protective sheath from the sheath intermediate by shaping an outer surface and an inner surface of the sheath intermediate to match the contour of the fan blade leading edge, the shaped inner surface forming an inner diameter slot configured to receive the fan blade leading edge.

14. The method according to claim 13, wherein the preform plate is generated from a stock plate by a contour roll plate technique.

15. The method according to claim 13, wherein the preform plate is generated from a stock plate by a method selected from the group consisting of a contour roll plate technique, conventional machining, and hot forging.

16. A method for manufacturing a protective sheath for a fan blade leading edge using a preform plate as input stock material, the preform plate having a flat surface and an inclined surface, the inclined surface having a spike extending away from the inclined surface, the spike being bordered by a first side and a second side, said method comprising:

bending the first side and the second side away from the spike to introduce a bend into the flat surface and to generate a sheath intermediate; and generating the protective sheath from the sheath intermediate by shaping an outer surface and an inner surface of the sheath intermediate to match the contour of the fan blade leading edge, the shaped inner surface forming an inner diameter slot configured to receive the fan blade leading edge, wherein generating the protective sheath from the sheath intermediate is performed by a superplastic forming process.

17. The method according to claim 16, wherein the superplastic forming process comprises the steps of:

placing the sheath intermediate over a mandrel in the shape of the fan blade leading edge;

heating the sheath intermediate to a temperature conducive to superplastic deformation; and using a tool to shape the outer surface and the inner surface of the sheath intermediate to match the contour of the fan blade leading edge.

18. The method according to claim 16, wherein bending the first side and the second side is performed by a cold forming process over a mandrel.

19. The method according to claim 16, wherein bending the first end and the second end is performed by a warm forming process over a mandrel.

20. A fan blade protective sheath having an outer surface and an inner diameter slot configured to receive a fan blade leading edge, the outer surface and the inner diameter slot having a shape that conforms to the shape of the fan blade leading edge, the fan blade protective sheath formed by a method comprising:

generating a preform plate from an input stock plate, the preform plate having a flat surface and an inclined surface, the inclined surface having a spike extending away from the inclined surface, the preform plate further including a first side and a second side flanking the spike;

bending the first side and the second side away from the spike to generate a sheath intermediate; and generating the protective sheath from the sheath intermediate by shaping an outer surface and an inner surface of the sheath intermediate to match the contour of the fan blade leading edge, the shaped inner surface forming the inner diameter slot, wherein the sheath intermediate is generated from the preform plate without discarding any material of the preform plate.

* * * * *